US008838167B2

(12) United States Patent  
Chapman (10) Patent No.: US 8,838,167 B2  
(45) Date of Patent: Sep. 16, 2014

(54) PORTABLE COMMUNICATION DEVICES WITH ACCESSORY FUNCTIONS AND RELATED METHODS

(71) Applicant: The Boeing Company, Seal Beach, CA (US)

(72) Inventor: Brian Scott Chapman, Fairfax, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/922,988

(22) Filed: Jun. 20, 2013

(65) Prior Publication Data

US 2013/0282937 A1 Oct. 24, 2013

Related U.S. Application Data

(63) Continuation of application No. 13/272,708, filed on Oct. 13, 2011, now Pat. No. 8,494,585.

(51) Int. Cl.
| | |
|---|---|
| *H04M 1/00* | (2006.01) |
| *G06F 13/00* | (2006.01) |
| *H04M 1/725* | (2006.01) |
| *H04M 1/02* | (2006.01) |
| *G06F 13/42* | (2006.01) |

(52) U.S. Cl.  
CPC ............ *G06F 13/4286* (2013.01); *G06F 13/00* (2013.01); *H04M 1/72575* (2013.01); *H04M 1/0274* (2013.01); *H04M 1/0254* (2013.01)  
USPC .................................... 455/550.1; 455/556.1

(58) Field of Classification Search  
USPC ............... 455/66.1, 67.11, 550.1, 517, 556.1, 455/556.2, 558; 709/228  
See application file for complete search history.

(56) References Cited

U.S. PATENT DOCUMENTS

| | | | |
|---|---|---|---|
| 6,636,750 | B1 | 10/2003 | Zurek et al. |
| 7,728,549 | B2 | 6/2010 | Bartlett et al. |
| 2010/0093401 | A1 | 4/2010 | Moran et al. |
| 2010/0277415 | A1 | 11/2010 | Shanmugam et al. |
| 2011/0055407 | A1 | 3/2011 | Lydon et al. |
| 2011/0230178 | A1 | 9/2011 | Jones et al. |

FOREIGN PATENT DOCUMENTS

| | | |
|---|---|---|
| DE | 200 09 217 U1 | 8/2000 |
| EP | 2 230 605 A1 | 9/2010 |

OTHER PUBLICATIONS

Meet the All-New PSION EP10; Model No. 7515; Model Name: EP10; www.psion.com; Psion PLC 2011; 3 pages.  
International Search Report and Written Opinion of International Application No. PCT/2012/054672; Dec. 11, 2012; 2 pages.

*Primary Examiner* — Sonny Trinh  
(74) *Attorney, Agent, or Firm* — Armstrong Teasdale LLP (57) ABSTRACT

Portable communication devices and related methods for use in supporting voice and/or data communication are provided. One example portable communication device includes a housing, a display device disposed at said housing, a processor disposed at least partially within said housing, the processor coupled to said display device, and an interface connector disposed at said housing and coupled to said processor. The interface connector is configured to couple to a module. The processor is configured to communicate, through said interface connector, via a plurality of communication protocols. The processor is configured to select at least one of the plurality of communication protocols based on the module coupled to the interface connector.

23 Claims, 9 Drawing Sheets

PORTABLE COMMUNICATION DEVICES WITH ACCESSORY FUNCTIONS AND RELATED METHODS

CROSS REFERENCE TO RELATED APPLICATIONS

This application is a continuation of U.S. patent application Ser. No. 13/272,708, filed Oct. 13, 2011, which is incorporated herein by reference in its entirety.

BACKGROUND

The field of the disclosure relates generally to portable communication devices and related methods, and more particularly, to portable communication device with modules providing one or more accessory functions.

Recently, portable and ultra-portable communication devices, such as smartphones, cellular phones, personal digital assistants (PDAs), etc., have grown in use and popularity among a variety of different types of users. As the market has progressed, more and more functionality has been incorporated into portable communication devices. More generally, as the number of different types of portable communication devices increases, the functionality included therein, as well as the demand for added functionality, also increases. Manufacturers of portable communication devices have responded to the increased demand for functionality by incorporating some additional functionality and opening the relevant operating systems to permit third parties to develop additional functionality.

As the functionality of the portable communication devices increases through effort of manufacturers and/or third parties, the amount and/or type of data accessed, received by and/or transmitted from such devices has also increased. With the increased access to data and the open operating systems provided by manufacturers, security policies are often implemented at the portable communication devices to limit exposure of data accessed by the portable communication device.

BRIEF DESCRIPTION

In one aspect, a portable communication device for use in supporting voice and/or data communication is provided. The portable communication device includes a housing, a processor disposed at least partially within the housing, and an interface connector disposed at the housing. The interface connector is coupled to the processor and configured to couple to a module configured to provide at least one accessory function. The processor is configured to communicate, through the interface connector, via a plurality of communication protocols. The processor is configured to select at least one of the plurality of communication protocols, based on the module coupled to the interface connector.

In another aspect, a portable communication device for use in supporting voice and/or data communication is provided. The portable communication device includes a housing, an interface connector disposed at least partially within the housing, a processor disposed within the housing and coupled to the interface connector, and a module coupled to the housing and the interface connector. The module is configured to provide at least one accessory function. The processor is configured to communicate with the module according to a plurality of communication protocols through an interface connector. The processor is configured to identify the module and communicate with the module, based on the identity of the module, according to at least one of the plurality of communication protocols.

In yet another aspect, a method for use in appending at least one accessory function to a portable communication device is provided. The portable communication device includes a processor and an interface connector. The method includes detecting the presence of a module coupled to the interface connector of the portable communication device, identifying the module, and selecting one of a plurality of communication protocols supported by the portable communication device to communicate through the interface connector with the module, based on the identity of the module.

The features, functions, and advantages that have been discussed can be achieved independently in various embodiments or may be combined in yet other embodiments, further details of which can be seen with reference to the following description and drawings.

DETAILED DESCRIPTION

The subject matter described herein relates generally to appending one or more accessory functions to a portable communication device by coupling a module to the portable communication device through an interface connector.

Figure 1:
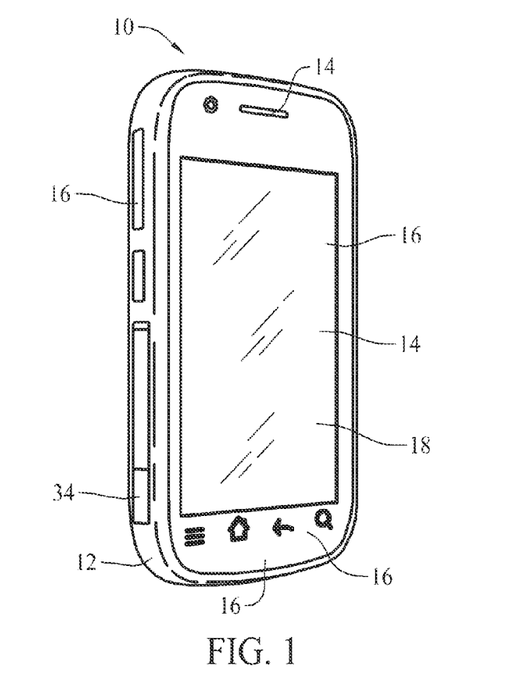
FIG. 1 is a front perspective view of a portable communication device according to one example embodiment of the present disclosure.
Figure 2:
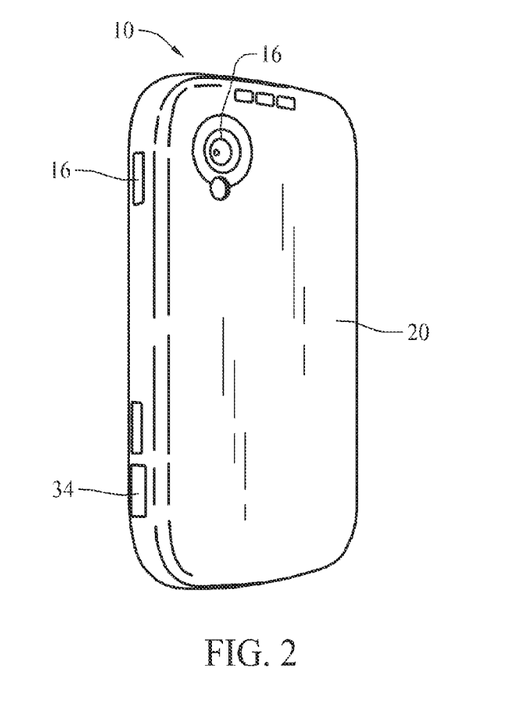
FIG. 2 is a back perspective view of the portable communication device of FIG. 1.

FIGS. 1 and 2 illustrate an exemplary portable communication device 10. In the exemplary embodiment, portable communication device 10 is provided for supporting voice communication with another device, such as another portable communication device. Moreover, portable communication device 10 may include a variety of other functionalities, including network access, SMS messaging, hosting of one or more applications, data processing, encryption, and/or other functions, etc. In this exemplary embodiment, portable communication device 10 is a smartphone, configured to communicate through one or more cellular networks.

As shown, portable communication device 10 includes a housing 12 and multiple presentation devices 14 disposed at least partially within housing 12. Presentation device 14 outputs information such as, but not limited to, data related to operation of portable communication device 10, commands, requested data, messages, one or more input devices (such as, a virtual keyboard), and/or any other type of data to a user. In several examples, presentation device 14 may include, for example, a liquid crystal display (LCD), a light-emitting diode (LED) display, a light-emitting diode (LED), a camera flash, an organic LED (OLED) display, and/or an "electronic ink" display. In some embodiments, multiple presentation devices 14 may be included to present data to a user visually and/or audibly. In this exemplary embodiment, presentation device 14 includes an audio output for use in voice communication.

In the exemplary embodiment, portable communication device 10 further includes multiple input devices 16 disposed at least partially within housing 12. Each input device 16 may be configured to receive selections, requests, commands, information, data, and/or any other type of inputs, according to one or more of the methods and/or processes described herein. Input devices 16 may include, for example, buttons, a keyboard, a microphone, a vibrator, a pointing device, a stylus, a touch sensitive panel (e.g., a touch pad or a touch screen), a gyroscope, an accelerometer, a digital compass, a position detector, a camera, a second camera, and/or an audio input interface. In the exemplary embodiment, a single component, such as a touch screen 18, functions as both presentation device 14 and input device 16.

In the exemplary embodiment, portable communication device 10 includes back panel 20, which is engaged to housing 12. Back panel 20 defines a cross-section substantially consistent with housing 12, thereby forming a substantially integral unit with housing 12 when coupled thereto. Back panel 20 is removable from the back side of portable communication device 10 to provide access to one or more aspects of portable communication device 10, including an interface connector discussed below.

Figure 3:
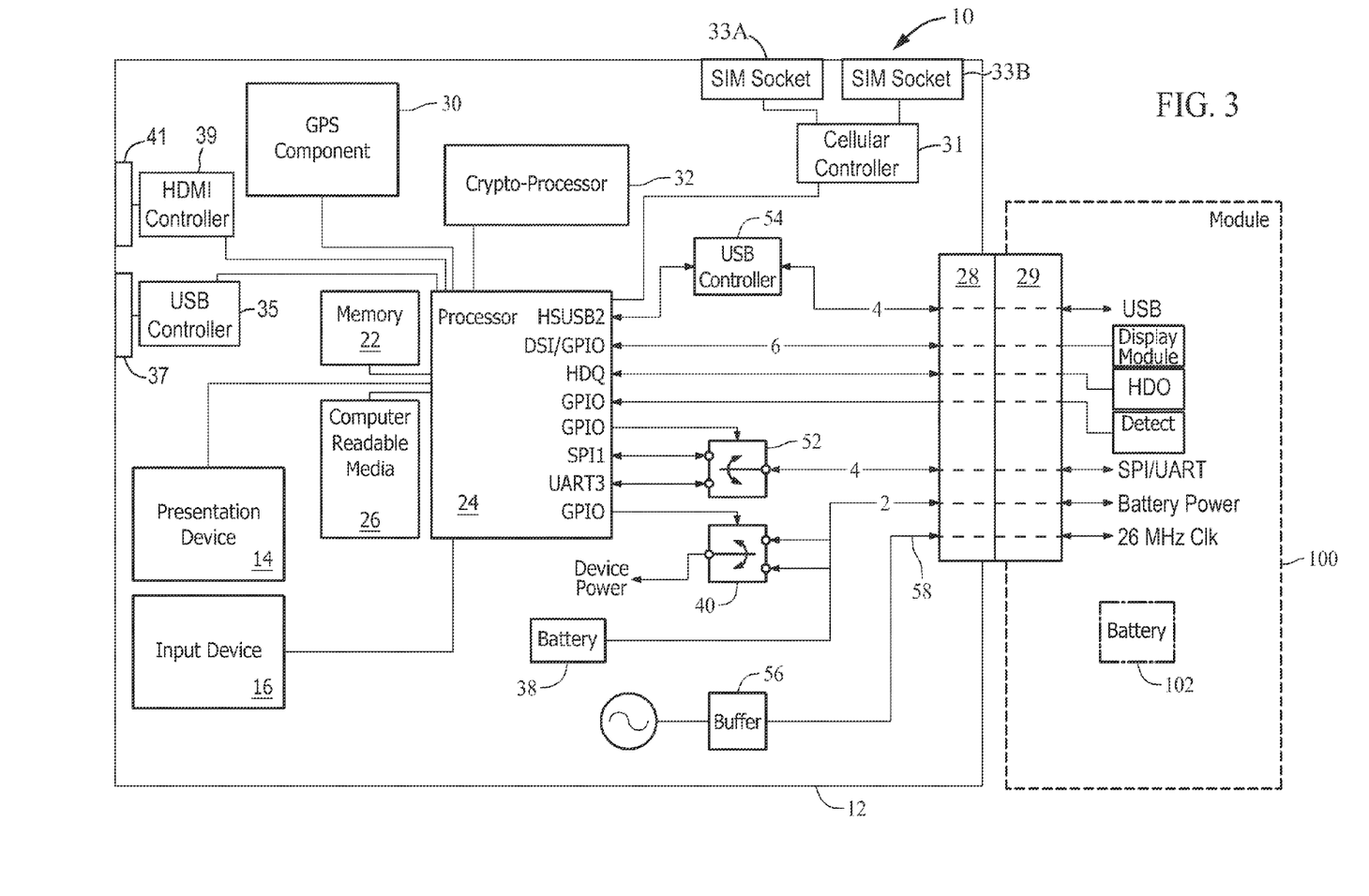
FIG. 3 is a block diagram of the portable communication device of FIG. 1.

FIG. 3 illustrates a block diagram of portable communication device 10. In the exemplary embodiment, portable communication device 10 includes a memory 22 and a processor 24 coupled to memory 22 for executing programmed instructions. Processor 24 may include one or more processing units (e.g., in a multi-core configuration). Portable communication device 10 is programmable to perform one or more operations described herein by programming memory 22 and/or processor 24. For example, processor 24 may be programmed by encoding an operation as executable instructions and providing the executable instructions in memory device 22.

Processor 24 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 24, cause processor 24 to perform at least a portion of the functions described herein. The above examples are exemplary only, and thus are not intended to limit in any way the definition and/or meaning of the term processor.

As shown, processor 24 includes a number of communication interfaces, such as universal serial bus (USB) interface, display serial interface (DSI), an HDQ interface (master/slave), a serial peripheral interface bus (SPI) interface, an I$^2$C bus, a universal asynchronous receiver/transmitter (UART) interface, a micro-USB interface, an HDMI interface, and several general purpose input/outputs (GPIOs). In the exemplary embodiment, USB interface from processor 24 utilizes a USC physical layer circuit (PHY IC) controller 54 to provide a full USB interface to USB 1.0, 2.0, 3.0 or other versions of USB compliant modules. Additionally, DSI interface is compliant with MIPI DSI 1.0 standard or other standards of display communication protocols. It should be appreciated that the number, the type and/or the standard of communication interfaces provided from processor 24 may be different in other portable communication device embodiments.

Memory 22, as described herein, is one or more devices that enable information such as executable instructions and/or other data to be stored and retrieved. Memory 22 may include one or more computer-readable media, such as, without limitation, dynamic random access memory (DRAM), static random access memory (SRAM), a solid state disk, and/or a hard disk. Memory 22 may be configured to store, without limitation, executable instructions, operating systems, applications, resources, installation scripts and/or any other type of data suitable for use with the methods and systems described herein.

Instructions for operating systems and applications are located in a functional form on non-transitory memory 22 for execution by processor 24 to perform one or more of the processes described herein. These instructions in the different embodiments may be embodied on different physical or tangible computer-readable media, such as memory 22 or another memory, such as a computer-readable media 26, which may include, without limitation, a flash drive, thumb drive, etc. Further, instructions are located in a functional form on non-transitory computer-readable media 26, which may include, without limitation, smart-media (SM) memory, compact flash (CF) memory, secure digital (SD) memory, memory stick (MS) memory, multimedia card (MMC) memory, and micro-drive memory, etc. Computer-readable media 26 is selectively insertable and/or removable from portable communication device 10 to permit access and/or execution by processor 24. In some embodiments, computer-readable media 26 is not removable.

Further, as shown, portable communication device 10 includes an interface connector 28 coupled to processor 24. In the exemplary embodiment, interface connector 28 provides a single, dedicated connector for providing communication between processor 24 and a module coupled to interface connector 28. Through interface connector 28, a module 100 may access one or more of the communication interfaces provided by processor 24 to communicate with processor 24 through different communication protocols, such as, for example, USB, DSI, I$^2$C, SPI, UART, etc.

Additionally, through interface connector 28, processor 24 provides HDQ (master/slave) interface for detection, interrogation, and authentication of the module. More specifically, in the exemplary embodiment, HDQ interface provides a single-wire protocol for communication between the HDQ master processor 24 and a HDQ slave device, such as module 100. Further, processor 24 provides a device power connection to module 100, which processor 24 utilizes to detect whether or not module 100 includes one or more batteries. Moreover, interface connector 28 provides access to multiple GPIOs from processor 24, which may be programmed by processor 24 to perform one or more processes depending on the type of module coupled thereto. For example, one of the GPIOs provides a detect connection, such that processor 24 is able to detect coupling of module 100 to interface connector 28. In the exemplary embodiment, interface connector 28 provides numerous communication channels between processor 24 and a module coupled to interface connector 28 to support a variety of communication protocols, alone or simultaneously. As should be apparent, however, interface connector 28 may provide one or more different communication channels between processor 24 and various other modules in other portable communication device embodiments.

Referring again to FIG. 3, portable communication device 10 includes a GPS component 30, which is configured to provide location data to processor 24. The location data permits processor 24 to determine the location of portable communication device 10 and/or provide functionality dependent on the location of portable communication device 10, such as, for example, navigation functionality. Moreover, portable communication device 10 includes a crypto-processor 32, which is configured to encrypt at least a portion of data accessed by processor 24 for communication to/from portable communication device 10 and/or storage therein. Accordingly, some data may be segregated from other applications and/or operations of the portable communication device 10, and kept at a higher level of security than such applications/operations. In this particular embodiment, GPS component 30 and crypto-processor 32 are disposed within housing 12, such that when back panel 20 is removed, GPS component 30 and crypto-processor 32 remain within housing 12 and coupled to processor 24.

In the exemplary embodiment, portable communication device 10 further includes a cellular controller 31 coupled to processor 24. Cellular controller 31 permits portable communication device 10 to communicate with a cellular network (not shown) to provide voice and/or data communication with the cellular network. In this example, portable communication device 10 includes two subscriber identity module (SIM) card sockets 33A and 33B coupled to cellular controller 31. In this manner, portable communication device 10 is capable of receiving two SIM cards associated with two different cellular accounts, selectable by a user of portable communication device 10. Specifically, in one example, portable communication device 10 is configured to access a personal cellular account and a business cellular account, allowing user to select therebetween to separate personal and business usage. It should be appreciated that a different number of SIM card sockets may be included in other embodiments.

Further, portable communication device 10 includes a USB controller 35 coupled to processor 24. As shown in FIG. 3, USB controller 35 is accessible through connector 37, which is separate from interface connector 28. In this manner, one or more different devices may communicate with portable communication device 10, but not coupled to housing 12 consistent with module 100. Similarly, in the exemplary embodiment, portable communication device 10 further includes a high-definition multimedia interface (HDMI) controller 2 coupled to processor 24 and accessible through a connector 41, separate from interface connector 28. In at least one embodiment, connectors 37 and/or 41 may provide micro-USB and/or micro-HDMI connections to portable communication device 10.

Additionally, or alternatively, portable communication device 10 may include one or more of a Bluetooth controller, a ZigBee controller, a Wi-Fi controller, etc. to provide one or more wireless communication channel separate from interface connector 28. While GPS component 30, crypto processor 32 and cellular controller 31 are provided at least partially in hardware, it should be further appreciated that one or more components integrated into portable communication device 10 may be provided through software and/or firmware associated with processor 24. In one example, processor 24 provides an air interface firewall, configured to analyze low-level air interface protocols of portable communication device 10 and permit or deny network transmissions based on approved network identities and characteristics. In this example, air interface protocol data from cellular controller 31 containing cellular network identities and characteristics is provided to processor 24 and analyzed by processor 24 to determine if portable communication device 10 should be permitted to conduct network transmissions via cellular networks identified by cellular controller 31. In this example, the level of analysis provided adds network security to portable communication device 10 by having processor 24 further authenticate the network connections of cellular controller 31 beyond using standard cellular network protocol authentication mechanisms of cellular controller 31 by themselves. It should be noted that other air interface components of portable communication device 10, such as, for example a Bluetooth controller, Wi-Fi controller, etc., may also be monitored by the air interface firewall.

It should be appreciated that other portable communication device embodiments may includes more or fewer components integrated with or external to processor 24 and usable separate from interface connector 28. Further, it should be appreciated that one or more components included in portable communication device 10 may interact with module 100 to provide a particular function. Still further, one or more components included in portable communication device 10 may be disabled, permitting processor 24 to utilize similar components within module 100.

In the exemplary embodiment, through interface connector 28, portable communication device 10 is configured to communicate with multiple different types of modules 100. Each different one of modules 100 generally provide accessory functionality to portable communication device 10, through addition of processing, memory, communication, and/or power functionality. In the exemplary embodiment, portable communication device 10 may provide accessory functionality through multiple different communication channels. Specifically, processor 24 and interface connector 28 provide several communication interfaces, from which module 100 is permitted to select. While exemplary module 100 utilizes each of the communication interfaces from processor 24, it should be appreciated that a module consistent with the present disclosure may utilize less than all communication interfaces available from processor 24. For example, a Pico projector module 100 may utilize only a display interface and/or a USB interface, along with the detect and/or the HDQ interfaces.

Modules 100 may be designed and/or provided to select among several communication protocols available from portable communication device 10. Accordingly, modules 100 may communicate with processor 24 according to a preferred communication protocol, such as USB, SPI, I$^2$C, UART, etc., based on an efficient communication channel between module 100 and processor 24, and not based on conforming module 100 to a single communication protocol available for known devices. In this manner, portable communication device 10 provides a substantially universal embodiment, by inclusion of interface connector 28.

It should be appreciated that various different types of modules 100 may be used with the portable communication device 10. For example, module 100 may include, without limitation, additional displays (e.g., large touch screens, pico projectors, etc.), sensors (e.g., health, nuclear, chemical, biological, etc.), radios (e.g., cellular radio, satellite radio, military radio, etc.), external power sources (e.g., extended batteries, solar power, chemical power, biological power, etc.), readers (e.g., biometrics, barcodes, radio frequency identifications (RFIDs), smart cards, etc.), enhanced positioning hardware (e.g., enhanced GPS, inertial navigation systems, etc.), auxiliary processors/memory and an encryption module (e.g., used with crypto processor 32 or in place of crypto processor 32, etc.) to provide one or more accessory functions. It should be appreciated that the modules listed herein are exemplary and not intended to limit the type and/or accessory function(s) provided by module 100.

During operation, when a module is coupled to portable communication device 10, processor 24 detects the presence of the module through a detection connection of interface connector 28, as illustrated in FIG. 3. The detection connection may pull, for example, an input of processor 24 to a logically high or low state to indicate a module is coupled thereto. In at least one other embodiment, processor 24 may detect module 100 through use of one or more mechanical devices, such as a contact switch. When module 100 is detected, processor 24 interrogates module 100 for the module's identity to determine if module 100 is an approved module. Specifically, in the exemplary embodiment, the identity of module 100 includes a numerical and/or alpha-numerical code, indicating manufacturer of module 100, a type of module 100, the unique serial number for module 100, and communication interfaces utilized by module 100. It should be understood that different information may be conveyed by the identity of a module suitable to couple to portable communication device 10.

In the exemplary embodiments, various different types of modules along the lines of module 100 may be used with portable communication device 10. In various embodiments, portable communication device 10 may restrict the modules usable therewith, by permitting only vendor approved modules to be utilized with portable communication device 10. As such, portable communication device 10 may include, stored in memory 22 and/or stored remotely and accessible by portable communication device 10 (e.g., via a wireless network, etc.), a list of identifies of modules approved for use with portable communication device 10. Based on the list of identifies and the identity of module 100, processor 24 is able to authenticate module 100. If module 100 is not approved, portable communication device 10 may halt and/or limit further communication with module 100.

Conversely, if module 100 is approved, processor 24 is configured to communicate with module 100. More specifically, by knowing the identity of the module, processor 24 is able to determine one or more communication protocols usable with the module. In one example, upon identifying the module as enhanced sized touch screen display (as compared to touch screen 18), processor 24 enables DSI, SPI, I²C, GPIOs and/or power interfaces to enable module 100 to communicate therewith. In other examples, different modules 100 may dictate one or more different communication protocols, which are each supported by portable communication device 10.

Upon establishing one or more communication channels therebetween, portable communication device 10 and module 100 communicate as necessary to permit processor 24 to utilize the accessory function provided by module 100. Communication channels therebetween are established by powering components associated with interface connector 28. For example, processor 24 is configured to disable power associated with USB communication channel, when USB communication channel is not selected for communication with module 100. Such disabled power may include, for example, powering down USB controller 54 associated with the USB interface.

Additionally, processor 24 may selectively enable one type of communication protocol over another communication protocol, using a shared communication channel. Specifically, as shown in FIG. 3, SPI communication and UART communication at least partially share a communication channel from processor 24. When module 100 is detected and one of these communication protocols is required, processor 24 alternately selects between SPI communication and UART communication as necessary to communicate with module 100. In the exemplary embodiment, a switch 52 is provided and controlled by a GPIO of processor 24 to selectively provide one of the SPI and UART communication interfaces. Switch 52 is a single-pull-double-throw (SPDT) switch in this particular example. In the exemplary embodiment, SPI and UART interfaces are suitable to be alternately provided because each provides the same logic level with the same number of inputs/outputs. In various embodiments, other communication interfaces and/or protocols may share one or more communication channels between processor 24 and module 100, potentially dependent on the similarities among the communication interfaces and/or protocols.

In the exemplary embodiment, when module 100 is detected, processor 24 determines if module 100 includes a module battery 102 through the device power connection. In various embodiments, portable communication device 10 includes a battery 38 to power processor 24 and/or other components of portable communication device 10. Module battery 102 may be utilized to supplement power to portable communication device 10. Specifically, in the exemplary embodiment, when portable communication device 10 detects module 100, processor 24 determines if module 100 includes module battery 102. If not, processor 24 controls switch 40 to provide power to and/or charge module 100. In this example, switch 40 includes a SPDT switch. In contrast, if module battery 102 is detected, processor 24 toggles switch 40 to power and/or charge portable communication device 10 from module battery 102. In this manner, the life of battery 38 and/or battery 102 may be extended, through bi-directional charging between batter 38 and battery 102. In other embodiments, processor 24 may continue to power portable communication device 10 from battery 38, even when module battery 102 is detected.

Further, when module battery 102 is detected, processor 24 may provide a section for presentation to a user, such that the user is permitted to select one of batteries 38 and 102 to power portable communication device 10 through an input to input device 16. Additionally, or alternatively, the user may select a direction of charge to determine which of batteries 28 and 102 is charged from the other. In at least on embodiment, battery 38 may be charged from module battery 102 of module 100. Further, when portable communication device 10 is powered from module battery 102, processor 24 may utilize an eject sequence to ensure power is uninterrupted to portable communication device 10 when module 100 in removed. In such an embodiment, processor 24 may provide an eject sequence to presentation device 14 to solicit user inputs to engage battery 38, prior to ejecting module 100.

Further, processor 24 is configured to manage power at said interface connector to permit hot-swap of module 100. More specifically, in the exemplary embodiment, at least one of the GPIOs of processor 24 is coupled to a module insertion connection of interface connector 28 and configured as to provide an interrupt to processor 24, when module 100 is coupled to interface connector 28. In response, processor 24 interrogates module 100 via the HDQ interface to read the identification of module 100 and determine if module 100 is an approved module. If module 100 is approved, processor enables communication interface(s) and/or power at interface connector 28 to permit and/or initiate communication between portable communication device 10 and module 100.

Additionally, in the exemplary embodiment, processor 24, through interface connector 28, provides a clock (CLK) connection 58 to module 100. CLK connection 58 may be used by module 100 to synchronize communication and/or data transfer between processor 24 and module 100. Specifically, for example, CLK connection 58 may be understood by module 100 to indicate the time and /or size of data to be transmitted to processor 24. Likewise, processor 24 utilizes CLK connection 58 to determine what type of data it is receiving from module 100. It should be appreciated that portable communication device 10 and/or module 100 may include various other methods for synchronizing data transfer therebetween. In the exemplary embodiment, CLK connection 58 includes a buffer 56 configured to enable or disable the CLK signal output to interface connector 28.

Figure 6:
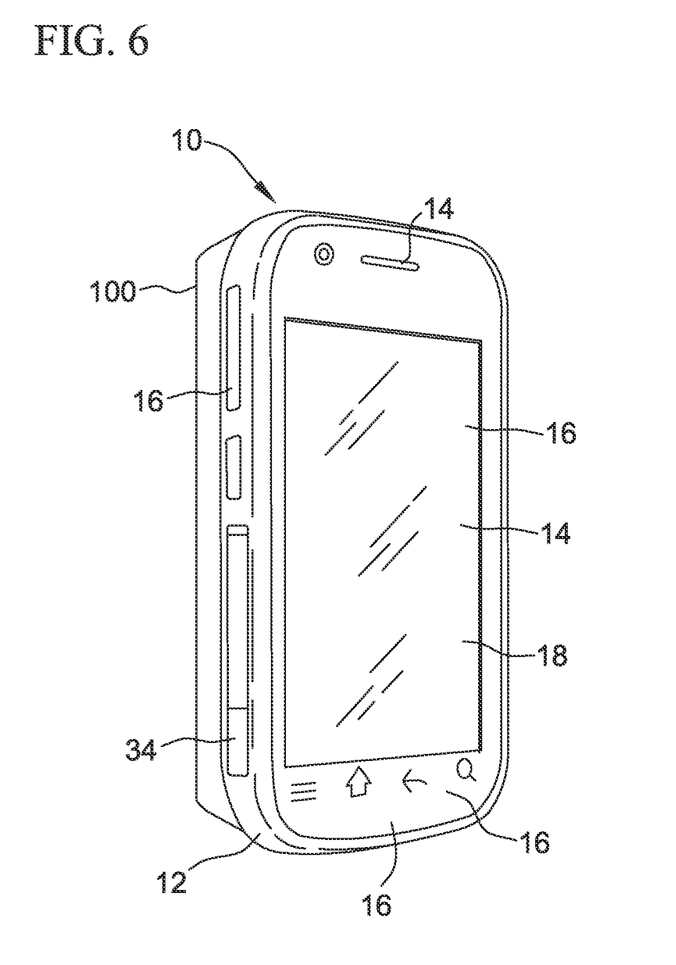
FIG. 6 is a perspective view of the portable communication device of FIG. 1, with a module coupled thereto.

It should be understood that module 100 may include a variety of different form-factors and couple to housing 12 in a variety of manners. In the exemplary embodiment, module 100 is coupled to portable communication device 10 in place of back panel 20. In this manner (as shown in FIG. 6), the cross-section of module 100 is substantially consistent with the cross-section of housing 12, thereby providing module 100 within substantially the same form-factor as portable communication device 10 and forming a substantially integral unit with housing 12 when coupled thereto. Other configurations (e.g., shapes, sizes, cross-sectional areas, etc.) of modules 100 may be included in other portable communication device embodiments.

FIG. 4 illustrates removal of back panel 20 and addition of module 100. Specifically, from the assembled portable communication device 10 (FIG. 4A), latching mechanisms 34 on either side of housing 12 are depressed to disengage latching mechanisms 34 from back panel 20. Back panel 20 then is slid relative to housing 12 (FIG. 4B) to disengage mounting tabs 36 of back panel 20 from corresponding parts of housing 12 and latching mechanisms 34. Once disengaged, back panel 20 is separated from housing 12 (FIG. 4C). Accordingly, the sequence from FIG. 4A to Fig, 4C provides a portable communication device 10 with the back panel 20 removed, as shown in FIG. 5.

Figure 4A:
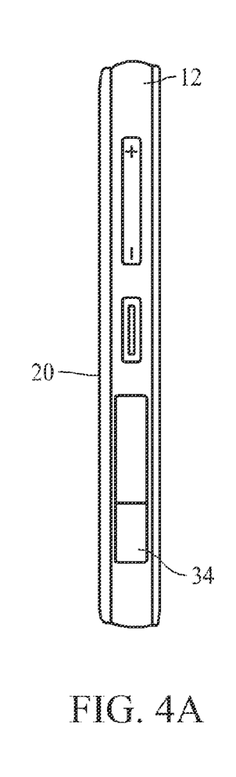
FIGS. 4A-F illustrate a sliding engagement of the portable communication device of FIG. 1 with a module.
Figure 4B:
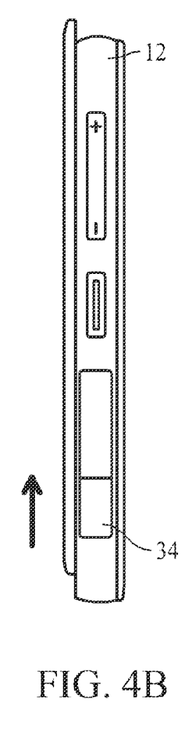
Figure 4C:
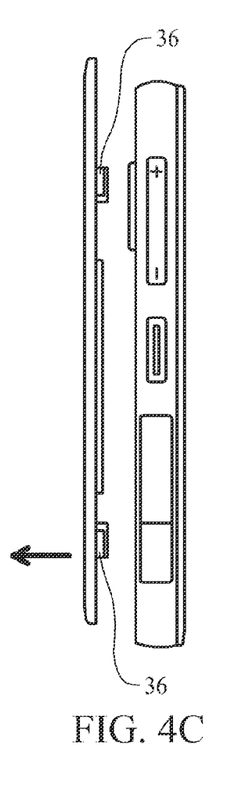
Figure 4D:
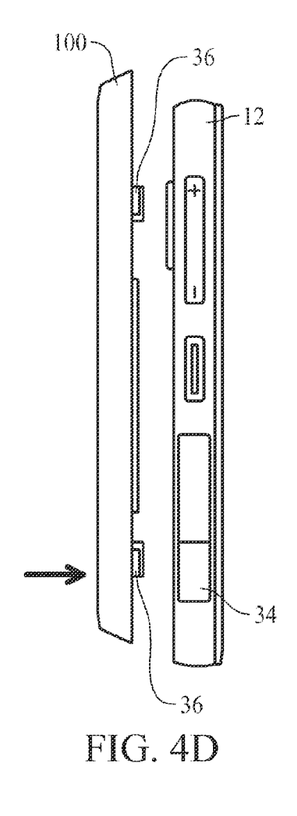
Figure 4E:
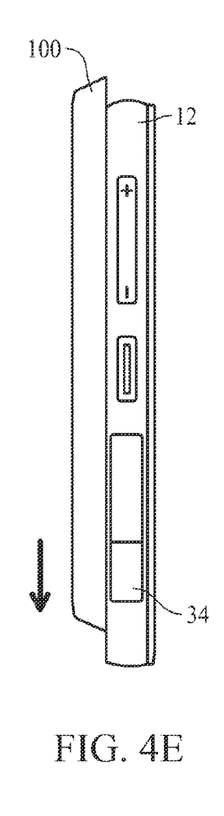
Figure 4F:
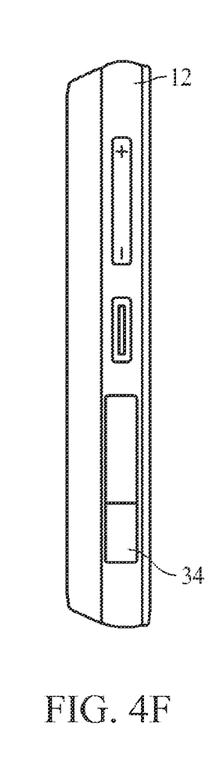

In order to couple module 100 to housing 12, module 100 is disposed proximate to housing 12 (FIG. 4D) and brought into contact with housing 12 (FIG. 4E) to engage mounting tabs 26 with complementary structures of housing 12. When in contact with housing 12, as shown in FIG. 4E, mounting tabs 36 of module 100 are aligned with corresponding features of housing 12 and latching mechanisms 34. Upon sliding movement of module 100, relative to housing 12, latching mechanisms 34 engage mounting tabs 36 to retain module 100 relative to housing 12 (FIG. 4F). Further detail of the engagement between housing 12 and module 100 is described below with reference to FIGS. 6-7.

Furthermore, while sliding engagement of module 100 and housing 12 is shown in FIGS. 4A-F is provided for purposes of illustration, it should be appreciated that various different types of engagement between module 100 and housing 12 may be utilized in other portable communication device embodiments.

Figure 5:
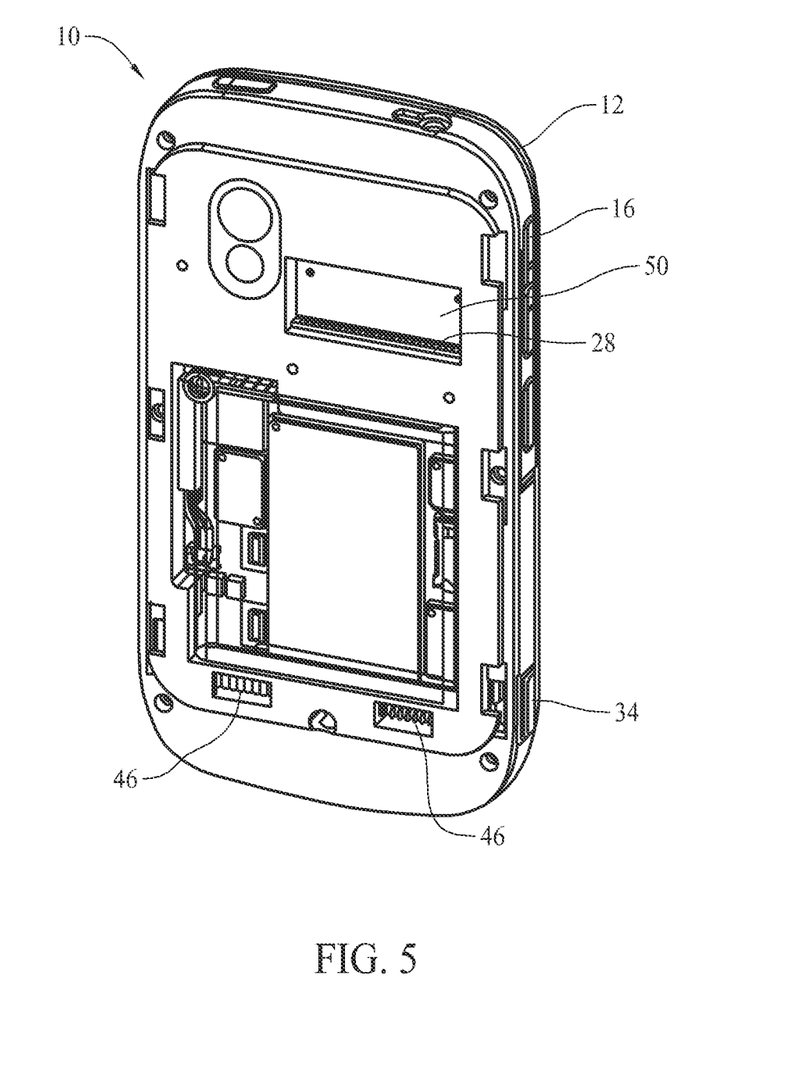
FIG. 5 is a back view of the portable communication device of FIG. 1, with the back panel omitted.
Figure 7:
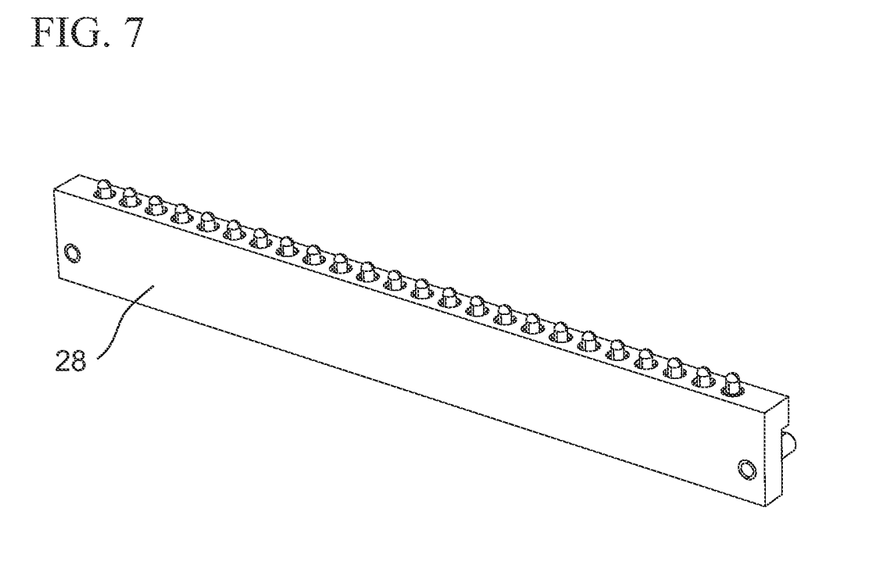
FIG. 7 is a front perspective view of an exemplary interface connector.
Figure 8:
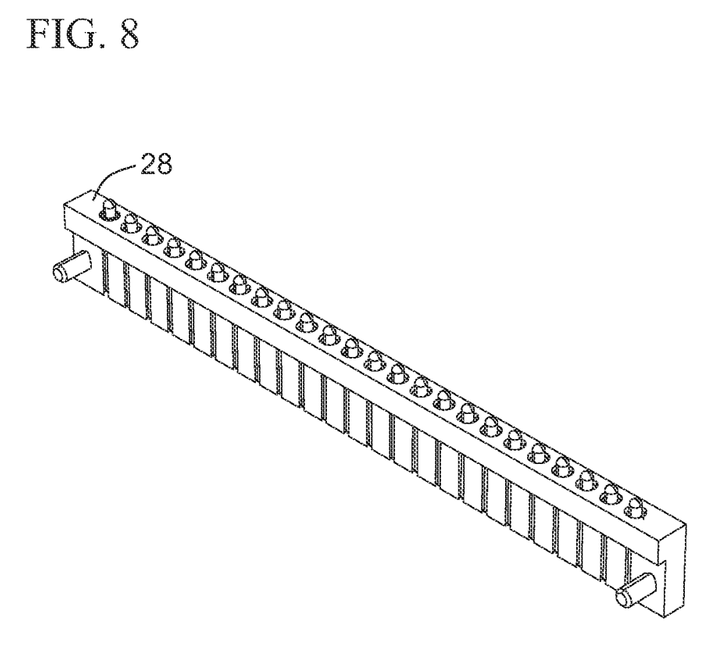
FIG. 8 is a back perspective view of the interface connector of FIG. 7.

FIG. 5 illustrates portable communication device 10 with back panel 20 removed, but no module 100 added. As shown, in the exemplary embodiment, interface connector 28 is accessible from the back side of housing 12. Accordingly, the sliding engagement of module 100 and housing 12, described with reference to FIG. 4, provides engagement of interface connector 28 with a mating connector of module 100. In this manner, module 100 electrically couples with processor 24, as shown in FIG. 3. In the exemplary embodiment, interface connector 28 is structured to provide a high mating cycle connector, which permits modules 100 to be repeatedly coupled and decoupled from interface connector 28 without substantially degrading the connection therebetween. Specifically, for example, interface connector 28 includes pins tapered at its tip and provides right-angle actuation to mate complimentary module connector 29, as shown in FIGS. 7-8. Further, interface connector 28 is through-hole mounted to a printed circuit board (PCB) (not shown) within housing 12. It should be appreciated that various types of connectors and/or manners of mounting may be employed to structure interface connector 28 for a high mating life cycle.

Figure 10:
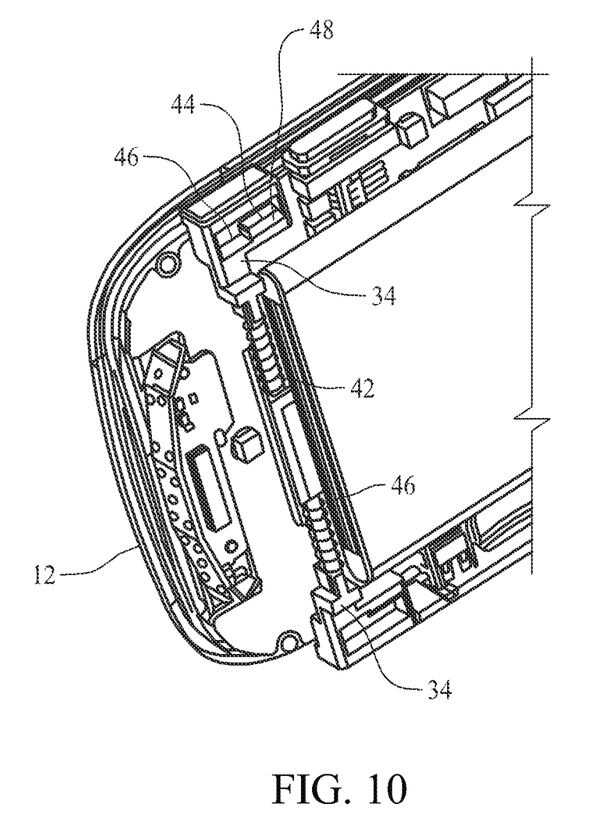
FIG. 10 is a sectional view of a partially disassembled back of the portable communication device of FIG. 1.

With reference to FIGS. 1 and 2, portable communication device 10 includes latching mechanisms 34 disposed on opposite sides of housing 12. Referring to FIG. 10, each latching mechanism 34 is biased toward an outer edge of housing 12, by a biasing member 42. In the exemplary embodiment, biasing member 42 is a spring extending about a portion of latching mechanism 34.

Figure 9:
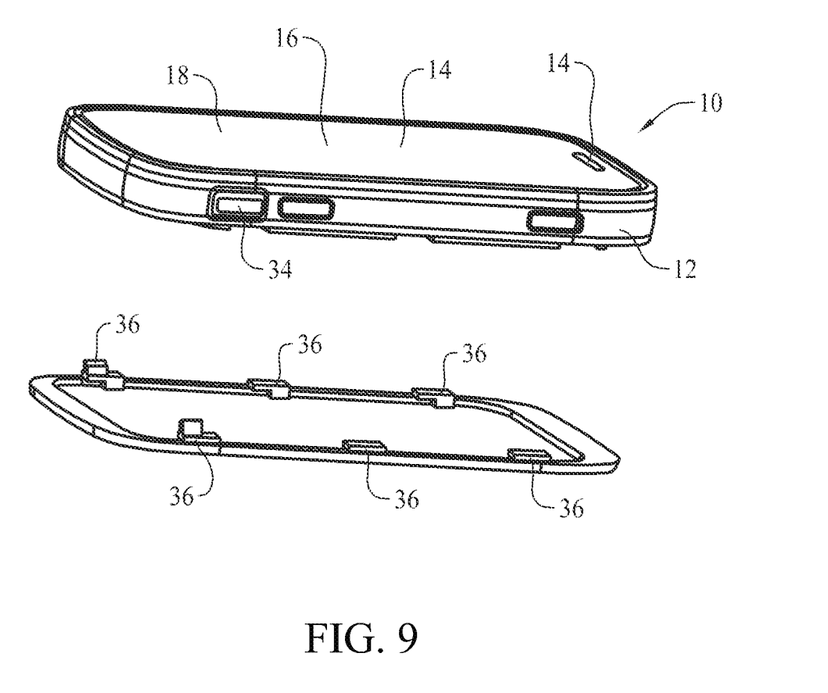
FIG. 9 is a partially exploded view of the portable communication device of FIG. 1.

When module 100 is slid relative to housing 12, mounting tabs 36 move along a first surface 44 of a protuberance 48 of latching mechanism 34. Simultaneously, a mating connector of module 100 initially engages interface connector 28. As shown in FIG. 5, a void 50 exists above interface connector 28, which permits complimentary module connector 29 of module 100 to be positioned proximate to interface connector 28 for sliding engagement therewith. Referring to FIG. 10, when the mounting tab 36 is past first surface 44, biasing member 42 biases latching member 34 towards the outer edge of housing 12, thereby causing mounting tab 36 to come to rest in recess 46 of latching mechanism 34. At this point, interface connector 28 is fully engaged in the mating connector of module 100, to provide communication therebetween. When disposed in recess 46, protuberance 48 defining first surface 44 retains the mounting tab 36 (shown in FIG. 9) and prevents sliding movement of module 100 relative to housing 12.

To remove module 100, each latching mechanism 34 is depressed inward, against the force of biasing member 42 to permit mounting tabs 36 to slide past protuberance 48, along first surface 44 of protuberance 48. Module 100 may then be sufficiently slid, as shown in FIG. 4, to disengage mounting tabs 36 and position the mating connector thereof within void 50, such that module 100 may be removed from housing 12 and interface connector 28. Other mounting tabs 36 of module 100 and/or housing 12 are structured to inhibit other relative movement between module 100 and housing 12. As should be apparent, other manners of engaging and/or releasably engaging module 100 and housing 12 to connect module 100 and interface connector 28 may be employed without departing from the scope of the present disclosure. In at least one example embodiment, module 100 may be snap engaged with housing 12 to provide such a connection.

In one embodiment, technical effects of the methods, systems, and computer-readable media described herein include at least one of: (a) detecting the presence of a module coupled to the interface connector of the portable communication device, (b) identifying the module, and (c) selecting one of a plurality of communication protocols supported by the portable communication device to communicate through the interface connector with the module, based on the identity of the module.

One or more aspects of the present disclosure transform a general-purpose computing device into a special-purpose computing device when configured to execute the instructions described herein.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable communication device for use in supporting voice and/or data communication, said portable communication device comprising:
   a housing;
   a processor disposed at least partially within said housing; and
   an interface connector disposed at said housing and coupled to said processor; and
   a back panel removably coupleable to said housing such that a module is coupleable to said portable communication device in place of said back panel when said back panel is uncoupled from said housing, said module configured to provide at least one accessory function, wherein said processor is configured to communicate, through said interface connector, via a plurality of communication protocols and to select at least one of the plurality of communication protocols based on the module coupled to said interface connector.

2. The portable communication device of claim 1, wherein said interface connector comprises at least two of a USB interface, an I²C interface, an SPI interface, a UART interface, and a display interface.

3. The portable communication device of claim 1, wherein said interface connector comprises a detect connection configured to permit said processor to detect the presence of the module.

4. The portable communication device of claim 1, wherein said processor is configured to authenticate the module, wherein said processor is configured to inhibit communication with an unapproved module.

5. The portable communication device of claim 4, wherein said processor is further configured to select the at least one of the plurality of communication protocols substantially only for approved modules.

6. The portable communication device of claim 1, further comprising a crypto processor coupled to the processor, said crypto processor configured to provide cryptographic operation on a portion of data accessed by said processor.

7. The portable communication device of claim 1, wherein housing is configured to slidably engage the module configured to provide at least one accessory function.

8. The portable communication device of claim 1, further comprising a GPS component coupled to said processor.

9. The portable communication device of claim 1, further comprising a cellular controller, and a SIM card socket coupled to said cellular controller, said SIM card socket configured to couple to a SIM card associated with a user account.

10. The portable communication device of claim 1, wherein said processor is configured to manage power at said interface connector to permit hot-swap of the module.

11. The portable communication device of claim 1, wherein said interface connector is structured to provide a high mating life cycle.

12. The portable communication device of claim 1, further comprising a battery disposed within said housing, said processor is configured to detect a module battery associated with the module configured to provide at least one accessory function and provide charging in at least one direction between said battery and the module battery.

13. The portable communication device of claim 1, wherein said back panel defines a cross-section substantially consistent with said housing.

14. A portable communication device for use in supporting voice and/or data communication, said portable communication device comprising:
   a housing;
   an interface connector disposed at least partially within said housing;
   a processor disposed within the housing and coupled to said interface connector;
   a back panel removably coupleable to said housing; and
   a module removably coupleable to said housing in place of said back panel when said back panel is uncoupled from said housing, said module coupled to said interface connector when said module is coupled to said housing, said module configured to provide at least one accessory function, wherein said processor is configured to communicate with said module according to a plurality of communication protocols through interface connector, said processor configured to identify said module and communicate with said module, based on the identity of said module, according to at least one of the plurality of communication protocols.

15. The portable communication device of claim 14, wherein said processor is configured to control power through said interface connector to enable hot-swap of said module with another module.

16. The portable communication device of claim 14, further comprising a crypto processor coupled to said processor and configured to encrypt at least a portion of data accessed by said processor.

17. The portable communication device of claim 14, wherein said module comprises at least one of an additional display, a radio, a reader, an enhanced positioning hardware, an auxiliary processor, and an encryption module to provide the accessory function.

18. The portable communication device of claim 14, further comprising a battery disposed within said housing, said module comprise a module battery, processor is configured to provide bi-directional charging between said battery and the module battery.

19. A method for use in appending at least one accessory function to a portable communication device, the portable communication device including a processor and an interface connector, said method comprising:
   uncoupling a back panel from a housing of the portable communication device;
   coupling a module to the housing in place of the back panel such that the module is coupled to the interface connector of the portable communication device;
   detecting the presence of the module coupled to the interface connector of the portable communication device;
   identifying, at the processor, the module; and selecting, at the processor, at least one of a plurality of communication protocols supported by the portable communication device to communicate through the interface connector with the module, based on the identity of the module.

20. The method of claim 19, wherein identifying the module includes determining if the module is an approved module for use with the portable communication device, based on the identity of the module.

21. The method of claim 20, further comprising powering at least one communication channel between the module and the portable communication device to support the selected communication protocol.

22. The method of claim 19, further comprising determining if the module includes at least one battery, selecting the at least one battery of the module to power the portable communication device when included, and monitoring a power level of the at least one battery.

23. The method of claim 19, wherein selecting at least one of a plurality of communication protocols includes selecting at least two of a plurality of communication protocols.

\* \* \* \* \*